United States Patent [19]

Kohtoh et al.

[11] Patent Number: 4,749,777

[45] Date of Patent: Jun. 7, 1988

[54] LIQUID CRYSTAL ALIGNING AGENT FROM TETRACARBOXYLIC ACID DIANHYDRIDE, DIAMINE AND MONOAMINE

[75] Inventors: Noriaki Kohtoh; Toyohiko Abe; Hiroyoshi Fukuro, all of Ichihara, Japan

[73] Assignee: Nissan Chemical Industries Ltd., Tokyo, Japan

[21] Appl. No.: 60,515

[22] Filed: Jun. 11, 1987

[51] Int. Cl.$^4$ .............. C08G 73/10; C08G 69/04
[52] U.S. Cl. .............. 528/351; 252/299.01; 350/330; 350/350 R; 428/1; 528/126; 528/182; 528/352; 528/353
[58] Field of Search .............. 528/351, 182, 126, 352, 528/353

[56] References Cited

U.S. PATENT DOCUMENTS 3,994,567  11/1976  Matsuo et al. .............. 350/160

OTHER PUBLICATIONS

Chemical Abstracts, vol. 99, 1983, p. 550, abstract no. 203665n, Columbus, Ohio, U.S.; & JP-A-57 133 432 (Canon K.K.) Aug. 18, 1982.

*Primary Examiner*—Harold D. Anderson
*Attorney, Agent, or Firm*—Oblon, Fisher, Spivak, McClelland & Maier

[57] ABSTRACT

A liquid crystal aligning agent consisting essentially of a polyimide resin obtained by the polymerization of a diamine, a tetracarboxylic acid dianhydride and a monoamine of the formula:

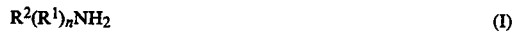

$$R^2(R^1)_n NH_2 \quad (I)$$

wherein $R^1$ is a divalent organic group, $R^2$ is an alkyl group having from 6 to 20 carbon atoms, and n is 0 or 1.

11 Claims, No Drawings

LIQUID CRYSTAL ALIGNING AGENT FROM TETRACARBOXYLIC ACID DIANHYDRIDE, DIAMINE AND MONOAMINE

The present invention relates to an agent for aligning liquid crystals for a liquid crystal cell. More particularly, the present invention relates to a liquid crystal aligning agent for a liquid crystal cell wherein liquid crystal molecules are aligned with an increased pretilt angle to the substrate.

Heretofore, an organic resin film such as a polyimide resin film has been most commonly used as an agent for aligning nematic liquid crystal molecules substantially in parallel with a transparent substrate such as glass or plastic film provided with a transparent electrode.

In such a case, the organic resin film formed on the substrate is rubbed with a cloth in a predetermined direction, whereby liquid crystal molecules are aligned in the direction of rubbing, and at the same time, liquid crystals are usually oriented with a pretilt angle of from 1° to 3° relative to the substrate surface.

As a method for aligning liquid crystal molecules with a large pretilt angle, it has been common to employ a method wherein an inorganic film such as a silicon oxide film is formed on the substrate by vapor deposition.

It is difficult to align liquid crystal molecules with a large pretilt angle by the method of rubbing the organic resin film formed on the substrate.

On the other hand, the method for vapor depositing an inorganic film on the substrate is cumbersome as compared with the rubbing method and is not necessarily a suitable method for the practical production on an industrial scale.

The present inventors have conducted expensive research to solve the above-mentioned problems, and have finally arrived at the present invention.

The present invention provides a liquid crystal aligning agent consisting essentially of a polyimide resin obtained by the polymerization of a diamine, a tetracarboxylic acid dianhydride and a monoamine of the formula:

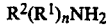

$$R^2(R^1)_nNH_2 \qquad \text{I}$$

wherein $R^1$ is a divalent organic group, $R^2$ is an alkyl group having from 6 to 20 carbon atoms, and n is 0 or 1.

More specifically, the present invention provides a liquid crystal aligning agent consisting essentially of a polyimide resin obtained by polymerizing a mol of a diamine, b mol of a tetracarboxylic dianhydride and c mol of a monoamine of the formula I in a relation to satisfy the following formulas:

$$b > a \geqq b/2 \qquad (1)$$

$$2(b-a) \geqq c > 0 \qquad (2)$$

Now, the present invention will be described in detail with reference to the preferred embodiments of the present invention.

The liquid crystal aligning agent of the present invention is to be used as a liquid crystal aligning agent for a liquid crystal cell by forming a film of the polyimide resin on a transparent substrate such as glass or plastic film provided with a transparent electrode, followed by rubbing treatment.

Specific examples of the diamine to be used for the liquid crystal aligning agent of the present invention include aromatic diamines such as p-phenylenediamine, m-phenylenediamine, diaminodiphenylmethane, diaminodiphenyl ether, 2,2-diaminodiphenylpropane, diaminodiphenylsulfone, diaminobenzophenone, diaminonaphthalene, 1,3-bis(4-aminophenoxy)benzene, 1,4-bis(4-aminophenoxy)benzene, 4,4'-di(4-aminophenoxy)diphenylsulfone, and 2,2-bis[4-(4-aminophenoxyphenyl]propane.

Further, an alicyclic diamine or an aliphatic diamine may also be used depending upon the particular purpose.

Specific examples of the alicyclic diamine include 1,4-diaminocyclohexane, 1,3-diaminocyclohexane, 4,4'-diaminodicyclohexylmethane, 4,4'-diamino-3,3'-dimethyldicyclohexylmethane, 4,4'-diaminodicyclohexylsulfone, and 4,4'-diaminodicyclohexyl ether.

Specific Examples of the aliphatic diamine include 1,2-diaminoethane, 1,3-diaminopropane, 1,4-diaminobutane and 1,6-diaminohexane.

These diamines may be used alone or in combination as a mixture of two or more different kinds.

Specific examples of the tetracarboxylic acid dianhydride to be used for the liquid crystal aligning agent of the present invention include an aromatic tetracarboxylic acid dianhydride such as pyromellitic acid dianhydride, benzophenonetetracarboxylic acid dianhydride or biphenyltetracarboxylic acid dianhydride, and an alicyclic tetracarboxylic acid dianhydride such as cyclobutanetetracarboxylic acid dianhydride, cyclopentanetetracarboxylic acid dianhydride or cyclohexanetetracarboxylic acid dianhydride, and an aliphatic tetracarboxylic acid dianhydride such as butanetetracarboxylic acid dianhydride.

These tetracarboxylic acid dianhydrides may be used alone or in combination as a mixture of two or more different kinds.

The divalent organic group $R^1$ of the monoamine of the formula I is an aliphatic group or its derivative, or an aromatic group or its derivative.

$R^2$ is an alkyl group having from 6 to 20 carbon atoms. If the number of carbon atoms is less than 5, the effect for increasing the pretilt angle of the liquid crystal molecules will be inadequate. On the other hand, if the number of carbon atoms exceeds 20, a disadvantage is likely to result such that the coating property of the liquid crystal aligning agent to the substrate tends to deteriorate.

Specific examples of the monoamine of the formula I include an aliphatic amine such as n-hexylamine, n-octylamine, n-decylamine, n-dodecylamine, n-hexadecylamine, 1,3-dimethylbutylamine, 1,5-dimethylhexylamine or 2-ethylhexylamine, and an organic amine such as p-aminophenylhexane, p-aminophenyloctane, p-aminophenyldodecane, p-aminophenyltetradecane, p-aminophenylhexadecane, p-aminophenoxyoctane, p-aminophenoxydodecane or p-aminophenoxyhexadecane.

These monoamines may be used alone or in combination as a mixture of two or more different kinds.

For the liquid crystal aligning agent of the present invention, it is necessary to use a polyimide resin obtained by the polymerizing a mol of a diamine, b mol of a tetracarboxylic acid dianhydride and c mol of a monoamine of the formula I in a relation to satisfy the following formulas:

$$b > a \geq b/2 \quad (1)$$

$$2(b-a) > c > 0 \quad (2)$$

If $b \leq a$, the polymerization of the monoamine of the formula I will be inadequate, and when the resulting polyimide resin is used for a liquid crystal aligning agent, it will be impossible to align liquid crystal molecules with a large pretilt angle.

If $a < b/2$, the polymerization degree of the resulting polyimide resin does not increase, whereby it is not possible to form a stable coating film of a liquid crystal aligning agent.

Further, if $2(b-a) < c$, when used as a liquid crystal aligning agent, the monoamine will be freed in the liquid crystal cell, and is likely to adversely affect the display characteristics of the liquid crystal cell.

There is no particular restriction as the manner of polymerization of the diamine, the tetracarboxylic acid dianhydride and the monoamine of the formula I. It is usual to employ a method wherein the diamine and the tetracarboxylic acid dianhydride are reacted, and then the monoamine of the formula I is polymerized thereto, or a method wherein the three components are simultaneously reacted and polymerized.

The method for forming a polyimide resin film after the reaction of the diamine, the tetracarboxylic acid dianhydride and the monoamine of the formula I, is preferably conducted, from the viewpoint of processing efficiency, in such a manner that the diamine, the tetracarboxylic acid dianhydride and the monoamine of the formula I are reacted to form a polyamic acid intermediate, and then the intermediate is subjected to dehydration and ring closure. In this case, it is possible to employ either a one step method wherein the formed polyamic acid intermediate is converted to the polyimide resin without being isolated, or a two step method wherein the formed polyamic acid intermediate is isolated, and then it is subjected to the dehydration and ring closure polymerization to form the polyimide resin.

The polymerization of the diamine, the tetracarboxylic acid dianhydride and the amine of the formula I may be conducted at an optional temperature within a range of from $-20°$ to $400°$ C., preferably from $-5°$ to $350°$ C.

The reaction for the formation of the polyamic acid intermediate may be conducted at an optional temperature within a range of from $-20°$ to $150°$ C., preferably from $-5°$ to $100°$ C.

A solution polymerization method is usually employed as a method for polymerizing the polyamic acid intermediate.

Specific examples of the solvent to be used for the solution polymerization, include N,N-dimethylformamide, N,N-dimethylacetamide, N-methylpyrrolidone, N-methylcaprolactam, dimethylsulfoxide, tetramethylurea, pyridine, dimethylsulfone, hexamethylphosphoneamide and butyrolactone. These solvents may be used alone or in combination as a mixture.

For the conversion of the polyamic acid intermediate to the polyimide resin, it is usual to employ a method wherein the dehydration and ring closure are conducted by heating. The temperature for this heating for dehydration and ring closure is selected within a range of from $150°$ to $450°$ C., preferably from $170°$ to $350°$ C.

The time required for the dehydration and ring closure is usually from 30 seconds to 10 hours, preferably 5 minutes to 5 hours, although it depends upon the reaction temperature.

As another method for the conversion of the polyamic acid intermediate to the polyimide resin, it is also possible to chemically conduct the ring closure by using a known catalyst for dehydration and ring closure.

The polyimide resin or polyamic acid intermediate solution obtained from the diamine, the tetracarboxylic acid dianhydride and the monoamine of the formula I of the present invention, is coated by spin coating or printing on a transparent substrate such as glass or plastic film provided with a transparent electrode, and then cured at a temperature of from $150°$ to $250°$ C. for from one minute to 2 hours to form a polyimide resin film having a thickness of from 200 to 3,000 Å, and then the polyimide resin film layer is subjected to rubbing treatment to obtain a liquid crystal aligning agent for a liquid crystal cell.

The liquid crystal aligning agent of the present invention is useful as a liquid crystal aligning agent for a liquid crystal cell having a large pretilt angle of the liquid crystal molecules.

Further, the pretilt angle of the liquid crystals can optionally be adjusted so long as a mol of the diamine, b mol of the tetracarboxylic acid dianhydride and c mol of the monoamine of the formula I satisfy the relation represented by the following formulas:

$$b > a \geq b/2 \quad (1)$$

$$2(b-a) \geq c > 0 \quad (2)$$

Now, the present invention will be described in further detail with reference to Examples. However, it should be understood that the present invention is by no means restricted to such specific Examples.

EXAMPLE 1

29.52 g (0.072 mol) of 2,2-bis[4-(4-aminophenoxy)phenyl]propane, 2.96 g (0.016 mol) of n-dodecylamine and 15.69 g (0.08 mol) of cyclobutanetetracarboxylic acid dianhydride are reacted in 433 g of N-methyl-2-pyrrolidone (hereinafter referred to simply as NMP) at room temperature for 4 hours to obtain a polyamic acid intermediate solution.

The reduced viscosity $\eta sp/c$ of the polymeric acid intermediate thus obtained was 0.69 dl/g (0.5 wt % NMP solution, $30°$ C.).

This solution was diluted with NMP to a total solid content of 2% by weight, and then spin-coated at 3,500 rpm on a glass substrate provided with a transparent electrode, and then heat-treated at $170°$ C. for 60 minutes to form a polyimide resin film having a thickness of from 1,000 to 1,500 Å. The coated film was rubbed with a cloth.

A pair of such substrates were assembled with a spacer of 50 μm interposed therebetween so that the coated films faced to each other with the respective rubbing directions arranged in an antiparallel relationship to each other. Then, liquid crystals (ZLI-2293, manufactured by Merk Company) were injected to obtain a homogeneous alignment cell.

This cell was rotated in a cross nikol, whereby brightness and darkness were distinctly observed, and excellent alignment in the direction of rubbing was confirmed.

With respect to this cell, the pretilt angle was measured by a magnet capacitance null method and was found to be 10°.

EXAMPLE 2

29.52 g (0.072 mol) of 2,2-bis[4-(4-aminophenoxy)-phenyl]propane, 3.85 g (0.016 mol) of n-hexadecylamine and 15.69 g (0.08 mol) of cyclobutanetetracarboxylic acid dianhydride were reacted in 422 g of NMP at room temperature for 4 hours to obtain a polyamic acid intermediate solution.

The reduced viscosity ηsp/c of the polyamic acid intermediate thus obtained was 0.52 dl/g (0.5 wt % NMP solution, 30° C.).

This solution was diluted with NMP to a total solid content of 2% by weight, and then a cell was prepared in the same manner as in Example 1.

The pretilt angle of the liquid crystal molecules was 19°, and the alignment was excellent.

EXAMPLE 3

29.52 g (0.072 mol) of 2,2-bis[4-(4-aminophenoxy)-phenyl]propane, 2.06 g (0.016 mol) of n-octylamine and 15.69 g (0.08 mol) of cyclobutanetetracarboxylic acid dianhydride was reacted in 422 g of NMP at room temperature for 4 hours to obtain a polyamic acid intermediate solution.

The reduced viscosity ηsp/c of the polyamic acid intermediate thus obtained was 0.62 dl/g (0.5 wt % NMP solution, 30° C.).

This solution was diluted with NMP to a total solid content of 2% by weight, and a cell was prepared in the same manner as in Example 1.

The pretilt angle of the liquid crystal molecules was 4.5°, and the alignment was excellent.

EXAMPLE 4

29.52 g (0.072 mol) of 2,2-bis[4-(4-aminophenoxy)-phenyl]propane, 4.18 g (0.016 mol) of 1-(p-aminophenyl)dodecane and 15.69 g (0.08 mol) of cyclobutanetetracarboxylic acid dianhydride was reacted in 445 g of NMP at room temperature for 4 hours to obtain a polyamic acid intermediate solution.

The reduced viscosity ηsp/c of the polyamic acid intermediate thus obtained was 0.51 dl/g (0.5 wt % NMP solution, 30° C.)

This solution was diluted with NMP to a total solid content of 2% by weight, and a cell was prepared in the same manner as in Example 1.

The pretilt angle of the liquid crystal molecules was 10.5°, and the alignment was excellent.

EXAMPLE 5

29.52 g (0.072 mol) of 2,2-bis[4-(4-aminophenoxy)-phenyl]propane and 15.69 g (0.08 mol) of cyclobutane tetracarboxylic acid dianhydride was reacted in 445 g of NMP at room temperature for 4 hours, and then 4.62 g (0.016 mol) of 1-(p-aminophenyl)tetradecane was added thereto, and the mixture was stirred for further 4 hours to obtain a polyamic acid intermediate solution.

The reduced viscosity ηsp/c of the polyamic acid intermediate thus obtained was 0.47 dl/g (0.5 wt % NMP solution, 30° C. )

This solution was diluted with NMP to a total solid content of 2% by weight, and a cell was prepared in the same manner as in Example 1.

The pretilt angle of the liquid crystal molecules was 12.5° and the alignment was excellent.

EXAMPLE 6

14.26 g (0.072 mol) of diaminodiphenylmethane, 3.85 g (0.016 mol) of n-hexadecylamine and 17.44 g (0.08 mol) of pyromellitic acid anhydride were reacted in 320 g of NMP at room temperature for 4 hours to obtain a polyamic acid intermediate solution.

The reduced viscosity ηsp/c of the polyamic acid intermediate thus obtained was 0.55 dl/g (0.5 wt % NMP solution, 30° C.)

This solution was diluted with NMP to a total solid content of 2% by weight and a cell was prepared in the same manner as in Example 1.

The pretilt angle of the liquid crystal molecules was 7.6°, and the alignment was excellent.

EXAMPLE 7

16.70 g (0.072 mol) of 4,4'-diamino-3,3'-dimethyldicyclohexylamine, 3.85 g (0.016 mol) of n-hexadecylamine and 15.69 g (0.08 mol) of cyclobutane tetracarboxylic acid dianhydride were reacted in 326 g of NMP at room temperature for 4 hours to obtain a polyamic acid intermediate solution.

The reduced viscosity ηsp/c of the polyamic acid intermediate thus obtained was 0.48 dl/g (0.5 wt % NMP solution, 30° C.)

This solution was diluted with NMP to a total solid content of 2% by weight, and a cell was prepared in the same manner as in Example 1.

The pretilt angle of the liquid crystal melecules was 14.5°, and the alignment was excellent.

COMPARATIVE EXAMPLE 1

29.52 g (0.072 mol) of 2,2-bis[4-(4-aminophenoxy)-phenyl]propane and 15.69 g (0.08 mol) of cyclobutanetetracarboxylic acid dianhydride were reacted in 433 g of NMP at room temperature for 4 hours to obtain a polyamic acid intermediate solution.

The reduced viscosity ηsp/c of the polyamic acid intermediate thus obtained was 0.38 dl/g (0.5 wt % NMP solution, 30° C.)

This solution was diluted with NMP to a total solid content of 2% by weight, and a cell was prepared in the same manner as in Example 1

The pretilt angle of the liquid crystal molecules was 2.7°.

COMPARATIVE EXAMPLE 2

29.52 g (0.072 mol) of 2,2-bis[4-(4-aminophenoxy)-phenyl]propane and 15.22 g (0.0776 mol) of cyclobutanetetracarboxylic acid dianhydride were reacted in 402.7 g of NMP at room temperature for 4 hours to obtain a polyamic acid intermediate solution.

The reduced viscosity ηsp/c of the polyamic acid intermediate thus obtained was 0.68 dl/g (0.5 wt % NMP solution, 30° C.).

This solution was diluted with NMP to a total solid content of 2% by weight, and a cell was prepared in the same manner as in Example 1.

The pretilt angle of the liquid crystal molecules was 2.4°.

COMPARATIVE EXAMPLE 3

A polyamic acid intermediate solution was prepared in the same manner as in Example 1 except that 1.17 g (0.016 mol) of n-butylamine was used instead of n- dodecylamine and 417 g of NMP was used as the solvent.

The reduced viscosity ηsp/c of the polyamic acid intermediate thus obtained was 0.46 dl/g (0.5 wt % NMP solution, 30° C.).

This solution was diluted with NMP to a total solid content of 2% by weight, and a cell was prepared in the same manner as in Example 1.

The pretilt angle of the liquid crystal molecules was 2.9°.

COMPARATIVE EXAMPLE 4

A polyamic acid intermediate solution was prepared in the same manner as in Example 1 except that 1.49 g (0.016 mol) of aniline was used instead of n-dodecylamine and 420 g of NMP was used as the solvent.

The reduced viscosity ηsp/c of the polyamic acid intermediate thus obtained was 0.64 dl/g (0.5 wt % NMP solution, 30° C.)

This solution was diluted with NMP to a total solid content of 2% by weight, and a cell was prepared in the same manner as in Example 1.

The pretilt angle of the liquid crystal molecules was 2.9°.

We claim:

1. A liquid crystal aligning agent consisting essentially of a polyimide resin obtained by the polymerization of a diamine, a tetracarboxylic acid dianhydride and a monoamine of the formula:

$$R^2(R^1)_n NH_2 \qquad (I)$$

wherein $R^1$ is a divalent organic group, $R^2$ is an alkyl group having from 6 to 20 carbon atoms, and n is 0 or 1.

2. The liquid crystal aligning agent according to claim 1 wherein the polyimide resin is obtained by polymerizing a mol of a diamine, b mol of a tetracarboxylic dianhydride and c mol of a monoamine of the formula I in a relation to satisfy the following formulas:

$$b > a \geqq b/2 \qquad (1)$$

$$2(b-a) \geqq c > 0 \qquad (2)$$

3. The liquid crystal aligning agent according to claim 2, wherein the polymerization is conducted at a temperature of from −20° to 400° C.

4. The liquid crystal aligning agent according to claim 1, wherein the diamine is an aromatic diamine selected from the group consisting of p-phenylene diamine, m-phenylenediamine, diaminodiphenylmethane, diaminodiphenyl ether, 2,2-diaminodiphenylpropane, diaminodiphenylsulfone, diaminobenzophenone, diaminonaphthalene, 1,3-bis(4-aminophenoxy)benzene, 1,4-bis(4-aminophenoxy)benzene, 4,4'-di(4-aminophenoxy)-diphenylsulfone and 2,2-bis[4-(4-aminophenoxy)phenyl]propane.

5. The liquid crystal aligning agent according to claim 1, wherein the diamine is an alicyclic diamine selected from the group consisting of 1,3-diaminocyclohexane, 1,4-diaminocyclohexane, 4,4'-diaminodicyclohexylmethane, 4,4'-diamino-3,3'-dimethyldicyclohexylmethane, 4,4'-diaminodicyclohexylsulfone and 4,4'-diaminodicyclohexyl ether.

6. The liquid crystal aligning agent according to claim 1, wherein the diamine is an aliphatic diamine selected from the group consisting of 1,2-diaminoethane, 1,3-diaminopropane, 1,4-diaminobutane and 1,6-diaminohexane.

7. The liquid crystal aligning agent according to claim 1, wherein the tetracarboxylic acid dianhydride is an aromatic tetracarboxylic acid dianhydride selected from the group consisting of pyromellitic acid dianhydride, benzophenonetetracarboxylic acid dianhydride and biphenyltetracarboxylic acid dianhydride.

8. The liquid cyrstal aligning agent according to claim 1, wherein the tetracarboxylic acid dianhydride is an alicyclic tetracarboxylic acid dianhydride selected from the group consisting of cyclobutanetetracarboxylic acid dianhydride, cyclopentanetetracarboxylic acid dianhydride and cyclohexanetetracarboxylic acid dianhydride.

9. The liquid crystal aligning agent according to claim 1, wherein the tetracarboxylic acid dianhydride is a butanetetracarboxylic acid dianhydride.

10. The liquid crystal aligning agent according to claim 1, wherein the monoamine is an aliphatic amine selected from the group consisting of n-hexylamine, n-octylamine, n-decylamine, n-dodecylamine, n-hexadecylamine, 1,3-dimethylbutylamine, 1,5-dimethylhexylamine and 2-ethylhexylamine.

11. The liquid crystal aligning agent according to claim 1, wherein the monoamine is an aromatic amine selected from the group consisting of p-aminophenylhexane, p-aminophenyloctane, p-aminophenyldodecane, p-aminophenyltetradecane, p-aminophenylhexadecane, p-aminophenoxyoctane, p-aminophenoxydodecane and p-aminophenoxyhexadecane.

* * * * *